United States Patent [19]

Rudolph et al.

[11] 4,107,040
[45] Aug. 15, 1978

[54] DRIVE DEVICE FOR RAKE ARM WITH ATTACHED SCREEN COMB IN CLEANING DEVICE FOR A WATER CONDUIT SCREEN

[75] Inventors: Siegfried Rudolph, Hanover; Josef Nöring, Burgwedel; August Schreiber, Hanover-Vinnhorst, all of Germany

[73] Assignee: Schreiber-Klaranlagen Dr.-Ing. Aug. Schreiber GmbH & Co. KG, Langenhagen, Germany

[21] Appl. No.: 799,920

[22] Filed: May 24, 1977

[51] Int. Cl.² ............... B01D 33/00; B01D 35/16
[52] U.S. Cl. ........................ 210/159; 210/353; 210/413
[58] Field of Search ........... 210/159, 523, 525, 527, 210/532, 533, 534, 536, 153, 171, 353, 413, 407

[56] References Cited

U.S. PATENT DOCUMENTS

| 2,128,345 | 8/1938 | Briggs | 210/159 |
| 2,128,346 | 8/1938 | Briggs | 210/159 |
| 3,909,411 | 9/1975 | Angele et al. | 210/159 |

Primary Examiner—Frank Sever
Attorney, Agent, or Firm—Watson, Cole, Grindle & Watson

[57] ABSTRACT

A device for cleaning of a screen located in a water conduit is provided with a screen rake which has a screen comb at one end thereof, the screen rake being mounted and driven by a chain to be guided in a path such that the screen comb cleans the screen, deposits the screenings in a bin and returns to clean the screen again in a continuous and non-interrupted fashion. The path is formed by a number of connected angle bars which are curved in shape and which are placed between a number of chain wheels around which the chain is wrapped for movement thereover. The screen rake is pivotably connected at the end opposite to the screen comb to the end of a hinged support, the hinged support being pivoted around a stationary bearing and having a counterweight at the other end thereof.

22 Claims, 3 Drawing Figures

DRIVE DEVICE FOR RAKE ARM WITH ATTACHED SCREEN COMB IN CLEANING DEVICE FOR A WATER CONDUIT SCREEN

BACKGROUND OF THE INVENTION

1. Field of the Invention

The present invention relates to devices for the cleaning of screens located in a water conduit such as a sewer.

2. Description of the Prior Art

Devices for the cleaning of screens which are located in a water conduit are known which include a screen rake capable of being moved from an intermediate or rest position above the water surface into a meshing position with the screen, and then into a substantially horizontal position above a collecting bin for emptying, wherein the screen rake comprises a screen comb connected to a rake arm. The screen comb can be tilted about a horizontal axis and the rake arm can be pivoted about a horizontal pivot axis, the rake being pivoted and moved in a vertical plane by a drive device. The rake arm and drive device are located on the downstream side of the screen.

As shown in U.S. Pat. No. 3,909,411 the screen rake, including the rake arm, is arranged such that during all movement thereof the rake arm projects beyond the highest vertical positioning of the screen comb when in its emptying position, such that the overall height of the screen assembly is much less than in screen assemblies, for example as shown in German Pat. No. 709,881, wherein the rake arm projects far beyond the highest positioning of the screen comb when the screen comb is at its highest (emptying) position. According to the U.S. Patent noted, sufficient room is made available for the positioning of a large enough collecting bin to receive all of the screenings dumped by the screen comb.

The drive device in the aforementioned U.S. Patent, however, consists of a cylinder-piston units which engage in an articulated manner with the rake arm and with a crank arm hinged thereto, and these units are provided with control and pressure-limiting valves. Such a drive device is relatively costly and subject to operational difficulties, especially when operated by inexperienced personnel. This tends to be the case because the cylinder-piston units have to be operated alternatively in opposite directions during a single cleansing process.

The present invention has as an object the development of an improved cleaning device as disclosed in U.S. Pat. No. 3,909,411 wherein as low a structural height of the device as possible is maintained, and wherein the rake arm is operated by a simple, trouble-free mechanical control arrangement.

SUMMARY OF THE INVENTION

According to the present invention, the drive device for the screen rake consists of a continuous chain or the like rotating over stationarily mounted deflection chain wheels. The chain, when moving between the deflection chain wheels, is coordinated to move in accordance with a curved path formed by a guide path means. The rake arm is connected to the chain and thus moves along the curved path formed by the guide path means, the rake arm in actuality comprising a two-armed lever with its pivot axis mounted so as to be movable along the guide path. In sum, the rake arm is attached at one end to a screen comb and at the opposite end to a hinged support means, the hinged support means being connected to the rake arm via a swing bearing having a horizontal pivot axis, and the hinged support means in turn is pivotably mounted to a stationary bearing which has a horizontal pivot axle. The fixed parts of the invention can be arranged or supported on the base of the screen.

With a screen rake constructed in accordance with the present invention, the advantage is attained that due to the interaction of the rake arm with the chain (which is preferably a roller chain), and the fact that the chain travels over the curved guide path means, and the fact that the rake arm is connected to the hinged support means, the desired movement of the rake arm and the screen comb attached to the end thereof is achieved. In other words, the screen comb is caused to engage with the screen bars in water conduit at a bottom portion thereof, to move up to the top of the screen bars, to move to a dumping position wherein the screenings are deposited in a suitable container, and then back to a position allowing for renewed engagement with the screen bars, all without a change of direction or the need for a counter-rotating operation in the functioning of the drive device. In the present inventive device all movements of the rake arm are such that the rake arm is never positioned higher than the tilt axis of the screen comb when in its emptying position. Thus, the overall height of the device is maintained at a minimum.

The means forming the curved guide path is constructed according to the desired path of the screen comb and its desired working range in its emptying position. In this way, due to a consistently uniform direction of rotation of the chain or the like, or of the motor driving the chain, a continuous raking out of the screenings from the screen is achieved, wherein the drive can be switched on or off as required through level-switching. Thus, the inventive device is distinguished as a simple, sturdy and inexpensive construction.

The dumping of the screenings from the screen comb in its emptying position can be effected in essentially the same manner suggested in U.S. Pat. No. 3,909,411 mentioned above; namely, by utilizing a release bolt on the rake arm which can be activated shortly before or upon the screen comb reaching its emptying position by a stationary stop, thereby allowing the screen comb to tilt about is horizontal tilt axis by approximately 90° and thereby dump its load.

A preferred path of movement of the screen rake is achieved if the bearings of three deflection chain wheels are located to form the corner points of an imaginary triangle, one side of which faces the screen bars of the screen to be cleaned. In this situation the bearing of a lower and an upper chain wheel form a first side of the triangle such that the side is oriented in an approximately perpendicular (or slightly inclined to the perpendicular), and the other two sides of the imaginary triangle intersect at the bearing of a third chain wheel at a point facing away from the screen bars at a level lying between the ends of the first side of the triangle. The chain is wrapped around a periphery of the three chain wheels; in addition, it is wrapped around a fourth chain wheel whose bearing is arranged between the first-mentioned chain wheels (the noted "lower" and "upper" chain wheels) and the third chain wheel, somewhat diagonally above the third chain wheel.

The rake arm is preferably constructed as a twin arm which includes two individual members spaced apart from one another but suitably connected. Each individual member is attached to a separate drive means (chain or the like) which travels over a separate but coordinated guide path means, etc.

Further objects, advantages and features of the invention will be apparent in the arrangement and construction of the constituent parts in detail as set forth in the following discussion taken together with the accompanying drawings.

DESCRIPTION OF THE PREFERRED EMBODIMENT

Figure 3:
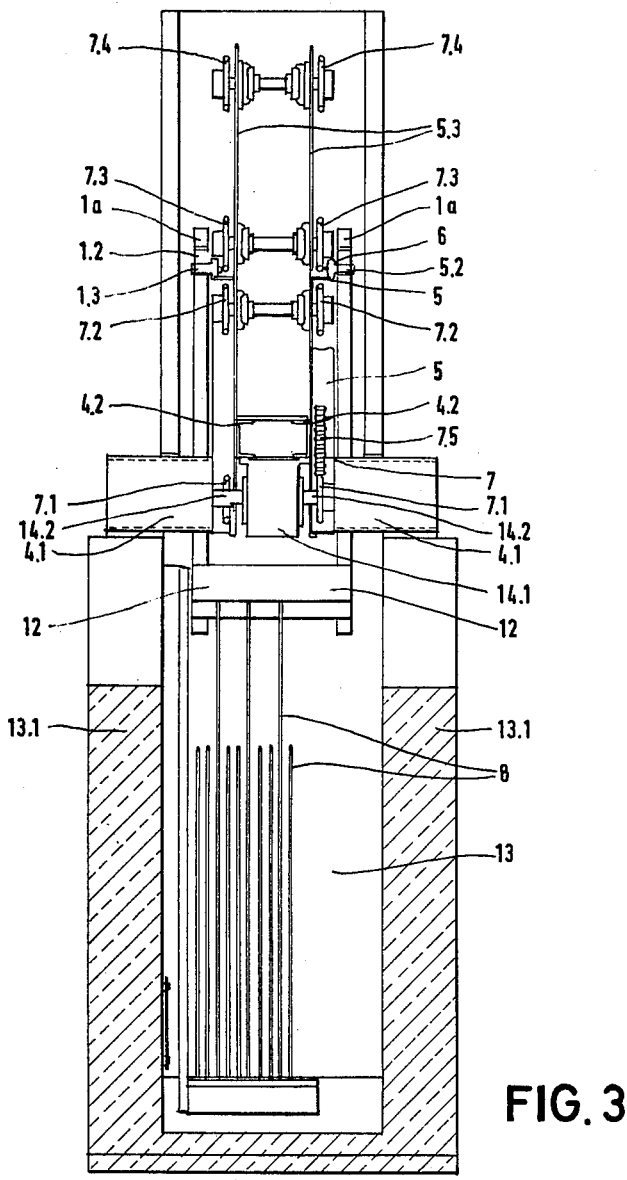
FIG. 3 shows the inventive device in vertical section along line C-D-E-F in FIG. 1.

The entire screen assembly which includes the inventive cleaning device consists of two parts: first, the screen which is composed of a number of substantially straight screen bars 8 which are placed to extend generally vertically between the walls 13.1 of a water conduit 13; and second, a screen rake formed of a rake arm 1 and a screen comb 2, the screen comb 2 extending over the entire breadth of the screen form by bars 8. The screen, as noted, has bars 8 which are positioned to completely screen between the lateral walls 13.1, and as shown in FIG. 3 some screen bars (e.g. every third bar) have a greater length (height) than other bars in order to form a coarser screen. The spacing between all the bars is such that tines of a screen comb 2 can be inserted therebetween.

Figure 2:
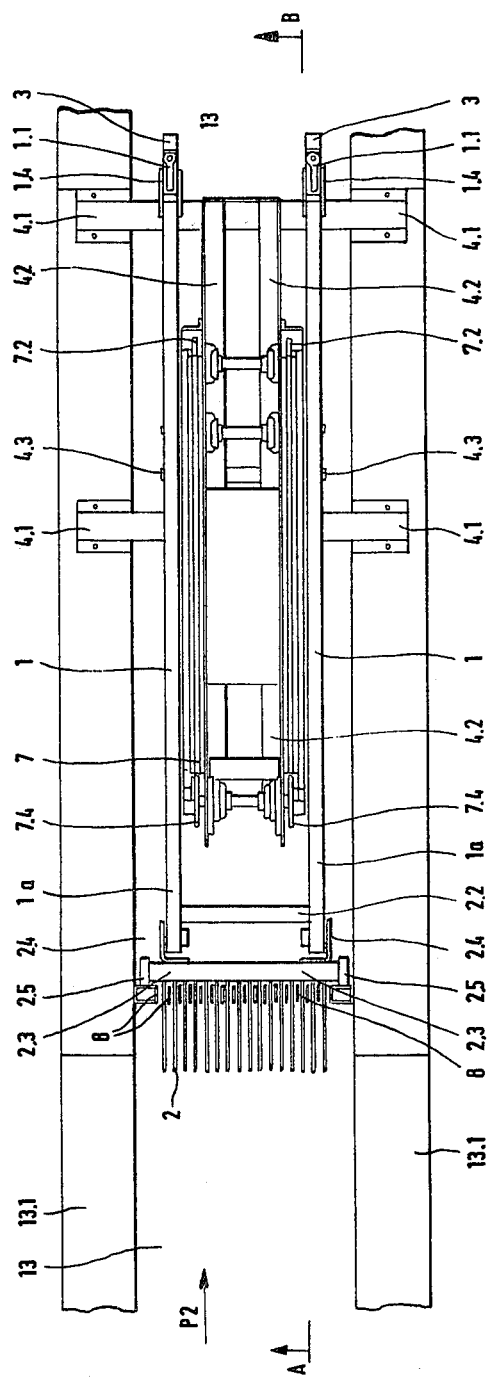
FIG. 2 shows the inventive device in plan view.

At a suitable height on the conduit walls 13.1 are placed two transverse bearing members 4.1 which span the water conduit 13 between walls 13.1 and which are rigidly connected thereto. Two longitudinal bearing members 4.2 are positioned on the transverse bearing members 4.1. A fixed bearing 4 is located below the longitudinal bearing members 4.2, this bearing 4 having a horizontally disposed pivot axle 4.3 which is connected to a hinged support 3 (see FIG. 2). Hinged support 3 is pivotable in a vertical plane.

A motor 14 is fixed to the front side of the longitudinal bearing members 4.2 (see FIG. 1), the motor (e.g. an electric motor) having appertaining gearing 14.1 from which projects a drive shaft 14.2 on both sides thereof. On the two projecting ends of the drive shaft 14.2 are positioned deflection chain wheels 7.1 (see FIG. 3), for example in the form of roller chain wheels, which function to drive a conveyor chain 7 or the like that is located above the water level in the conduit 13 and which forms the drive device for the rake arm 1.

Figure 1:
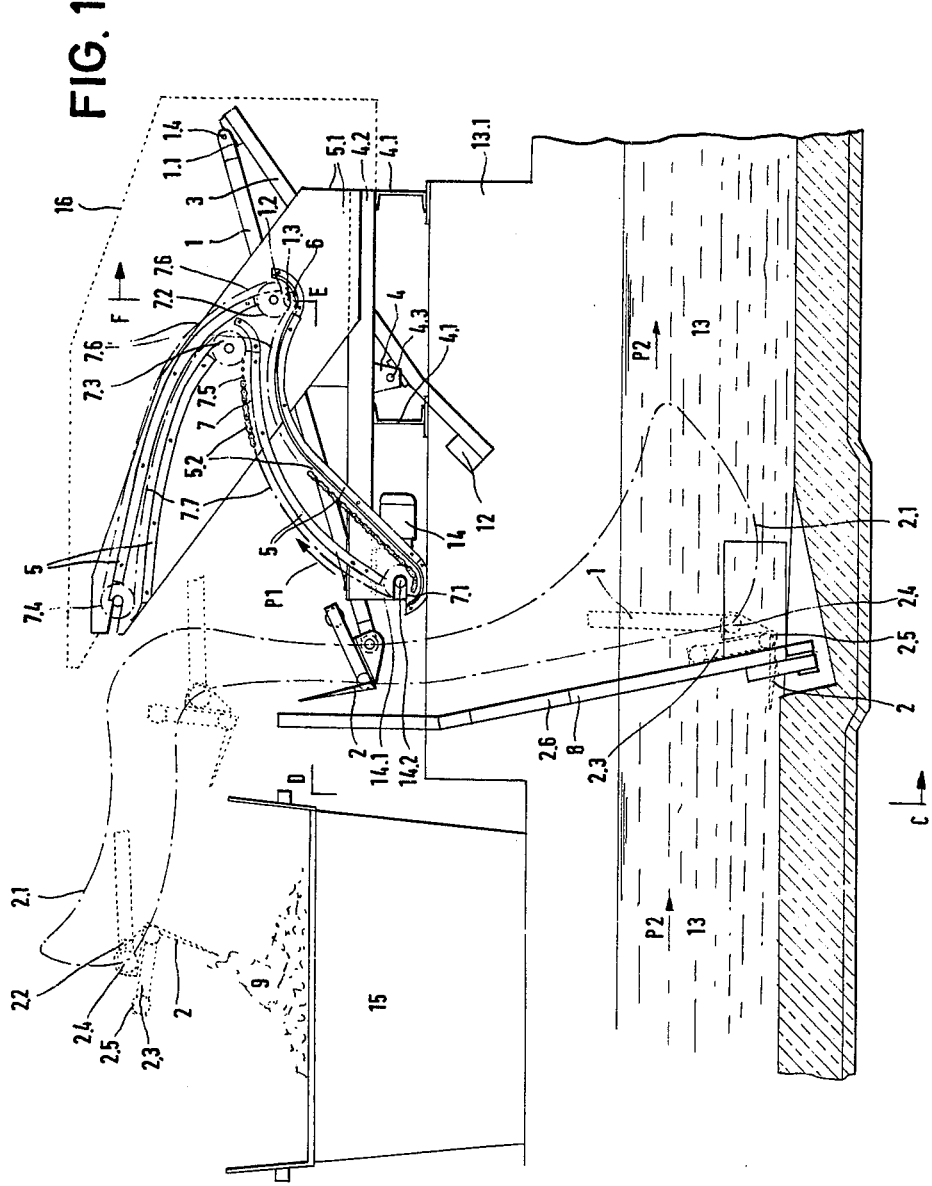
FIG. 1 shows the inventive device with screen rake in a vertical section along the line A-B in FIG. 2.

The rake arm 1 with its drive device formed by the chain 7 or the like is positioned together with the motor 14 (with attachments) on the downstream or discharge side of the screen formed by bars 8 as shown in FIG. 1.

A counter weight 12 is positioned on the end of hinged support 3 below the bearing 4 in order to balance the weight of the screen rake 2 when in its lowest position. At the opposite end of the hinged support 3 (the upper end) two swing bearings 1.1 are positioned having horizontal pivot axes 1.4 to which the rake arm 1 is pivotably mounted in vertical plane. The rake arm 1 is mounted on a guide bearing 1.2 on each side thereof to vertically rotate about a horizontal pivot or bearing axle 1.3, the guide bearing 1.2 being positioned about one third of the way between the swing bearing 1.1 and the opposite end thereof. A support roller 6 is rotatably mounted on the pivot or bearing axle 1.3 which diverts the supporting forces for the rake arm 1 via a guide path means 5 which is appropriately bent (curved) into a certain shape and is supported by framework 5.1. The means 5 is formed by a combination of angle bars or flat steel bars. The axle 1.3 engages the rotating chain 7 which in turn is mounted by means of rollers 7.5 (only some of which are shown in the drawings) on slide bar 5.2, which preferably consists of a plastic material, and which chain rotates around deflection chain wheels 7.1, 7.2, 7.3 and 7.4. The chain 7 is set in motion in this instance by chain wheel 7.1 driven by motor 14.

The framework 5.1 which supports the curved angle bars of the path means 5 and the screen rake consists of steel plates 5.3 attached to the longitudinal bearing members 4.2. The slide bars 5.2 are fixed on the curved angle bars 5.

In order to obtain greater stability, rake arm 1 is constructed as a twin arm so as to avoid any reciprocal torsion forces. Thus, there is located on each respective side of the framework 5.1 (at a corresponding point) an individual arm 1a, each with a support roller 6 and each with a drive via a conveying chain 7 and a coordinated guide path means 5. The individual arms 1a are also connected at their ends facing the screen comb 2 by a transverse strut 2.2 and in this way are additionally protected against torsions. The hinged support 3 is constructed in a similar manner as a twin support (see FIG. 2).

The screen comb 2 and the transverse bearing members 4.1 can be adjusted (by means not shown) to alter the breadth thereof in order to accomodate a broader or narrower water conduit 13 and screen with bars 8.

The deflection chain wheels 7.2 and 7.4 are positioned with the chain wheel 7.1 at the corners of an imaginary triangle, the deflection wheel 7.2 serving to deflect the portion of chain 7.6 on the right (as shown in FIG. 1), and the deflection chain wheel 7.3, itself being positioned just to the left and slightly above the deflection wheel 7.2, serving to deflect the left portion 7.7 of the chain. In this way the rake arm 1 is held and guided in a specific direction on the curved angle bars 5.

The guide path means 5, formed by the multiple angle bars bent (curved) in shape, is divided into four sections which extend, respectively, between the bearings of the chain wheels 7.1 and 7.3; between chain wheels 7.3 and 7.4 (these two sections indicating upward movement of the portion 7.7); between chain wheels 7.4 and 7.2; and between chain wheels 7.2 and 7.1 (these two sections indicating downward movement of the chain portion 7.6).

The construction of these four sections is such that the guide path means 5 for the chain strand portion 7.7 between the chain wheels 7.1 and 7.3 forms a circular arc which, when traveled, produces a straight, slightly inclined rake path. The chain is then deflected by deflection chain wheel 7.3 and is brought into the section of the guide path means 5 between the chain wheels 7.3 and 7.4. During the course of traversing this initially steep and then decreasingly steep rising pathway, the positioning of the rake arm 1 is such that the screen comb 2 is lifted past the screen bars 8 to a position over the middle of a relatively large collecting bin or container 15.

The deflection chain wheel 7.4 (which can simultaneously be used as a chain tightening wheel) conveys the chain into the down-running portion 7.6. The guide path means 5 in this section (between chain wheels 7.4 and 7.2) is similar to the path between chain wheels 7.3 and 7.4, and effects a throttled-back downward travel of the screen rake without the screen comb traversing the screen bars 8.

The deflection chain wheel 7.2 causes the chain 7 and thus also the bearing axles 1.3 into a position such that the rake arm 1 is placed in a rest position, and after passing this rest position or after the restarting of the motor 14, the chain 7 is brought into the last guide path section between chain wheels 7.2 and 7.1. This section is so formed that initially a circular movement of the rake arm 1 about the horizontal pivot axle 4.3 takes place. A subsequent straight path section causes the screen rake to swing in from a long way back such that screen comb 2 is engaged with the screen bars 8.

FIG. 1 illustrates with dotted lines both the engagement of the screen comb 2 with the lower part of the screen formed by bars 8, and also the rake arm 1 positioned in its intermediate and upper (unloading) position. In this latter position the screen comb 2 is shown in its dumping orientation. Also depicted is the path 2.1 (broken line) of the screen comb 2 (or actually of a horizontal pivot axle 2.4 of the screen comb 2 provided on the free end of the rake arm 1) from the point of engagement of the screen comb 2 with screen bars 8 to the unloading point and back again into engagement again. The operation of the screen rake 1.2 takes place in a simple manner as follows.

In its intermediate or rest position, the rake arm 1 as well as screen comb 2 is located above the water level. As soon as a certain amount of screenings has accumulated on the left, i.e. the supply or upstream side of the screen 8 in FIG. 1 by the action of a build up, the motor 14 attached to the framework 5.1 of the screen rake is switched on, whereupon the chain is set in motion in the direction of the arrow P.1. Due to the engagement of the bearing axle 1.3 of the rake arm 1 in the chain 7, the bearing surface 1.2 and thus the rake arm 1 are entrained by the chain 7. It should be noted that the direction of flow of the water in the conduit 13 is marked by the arrows P.2. Because of the connection of the rake arm 1 to the hinged support 3, the screen comb 2, which is initially located with its tines between the bars 8 of the screen and which is supported by means of a comb-bearing member 2.3 and tread rollers 2.5 which move along guide rails 2.6 that extend upwardly substantially like the screen 8 which is inclined slightly against the vertical, describes the path 2.1. The screen comb entrains the screenings until the rake arm 1 reaches the upper horizontal position, and then it continues to move approximately horizontally and axially until the screen comb 2 reaches its discharge point above the relatively large collecting bin or container 15 (which itself is from time to time removed or emptied). In the last-mentioned position of the rake arm 1, the screen comb 2 which is located at its discharge point is tipped with its comb bearing member 2.3 about the horizontal pivot axle 2.4 by approximately 90° down into the illustrated dumping position, so that the screenings 9 fall into the collecting bin 15. The screen comb 2 is then pivoted back again and further describes the path 2.1 until it reaches its rest position.

The tipping movement of the screen comb 2 can, as already mentioned, be effected in suitable manner, e.g., as is stated in U.S. Pat. No. 3,909,411. The same applies to the construction of the screen 8 in order to save a special emergency overflow. For switching the motor 14 on and off, there are provided level switches above and below the screen bars 8 in known and non-illustrated manner.

The screen rake and attachments, i.e. the longitudinal bearing members 4.2 lying on the transverse bearing members 4.1; framework 5.1 including rake arm 1 with hinged support 3; rotating chain 7 and reflection chain wheels 7.1, 7.2, 7.3, 7.4; guide paths 5; drive motor 14; etc. (with exception of the screen comb 2 which is more or less broad depending on the breadth of the water conduit 13), can be prefabricated and protected against atmospheric influences by a covering hood 16. The covering hood 16 can, in this instance, have a lesser breadth than the water conduit 13 as a result of the possible compressed structural form of the screen rake.

The roller chain 7 always moves in the same direction during the entire operation. In this way fewer centers of disturbance occur than in the case of a drive by means of cylinder-piston units. The apparatus in also less susceptible to disturbance by continuous operation and can be operated by unskilled personnel.

We claim:

1. In a device for cleaning a screen located in a water conduit wherein the device includes a screen rake having an arm and a screen comb at one end thereof, the rake being mounted to be moved from an intermediate position above the water level in the conduit, to a position in engagement with the screen, to a position above a collecting bin where the screen comb is tilted about a horizontal axis to dump its carried screenings, and wherein the rake arm is mounted for pivoting about a horizontal pivot axis and wherein a drive device is connected to said rake arm for pivoting said arm and moving said arm in a vertical plane downstream of the screen;

the improvement wherein the drive device includes a continuous chain,
stationarily mounted deflection chain wheels over which said continuous chain is mounted to run,
a stationary curved guide path means positioned entirely above and outside of said conduit and between said deflection chain wheels over which said continuous chain runs; and
the additional improvement wherein
the rake arm comprises a two-armed lever which has a pivot axle connected to said continuous chain for movement thereof,
the rake arm being connected at the end thereof opposite the end attached to the screen comb adjacent one end of a hinged support means, said connection including a swing bearing having a horizontal pivot axle, and
said hinged support means being pivotably mounted on a stationary bearing having a horizontal pivot axle.

2. The device according to claim 1 wherein said continuous chain comprises a endless chain of connected rollers, said rollers being movable over said stationary curved guide path means.

3. The device according to claim 2 wherein said stationarily mounted deflection chain wheels comprise four chain wheels, each mounted by way of axial bearings; three of said wheels being mounted to form the corner points of an imaginary triangle, the first two of said three wheels being mounted in an approximately vertical fashion to form one side of the triangle such that it faces the screen located in the water conduit, and the third of said three wheels being positioned between said two wheels but downstream thereof away from the screen such that the other two sides of the triangle intersect facing away from the screen on a level lying between the ends of said one side of the triangle; and the fourth of said wheels being mounted between the first two wheels of said three wheels and the third of said three wheels, diagonally above the third of said three wheels, said chain being mounted so as to be deflected in a corresponding fashion around the third and fourth wheels.

4. The device according to claim 3 wherein said guide path means between the lower of said first two wheels and said third wheel initially rises obliquely in rectilinear fashion, then in upward curved fashion, and then downwardly; wherein said guide path means between said third wheel and the upper of said first two wheels initially curves slightly upwardly, then in an increasingly more shallow curve, and finally approximately rectilinearly; wherein the guide path means between the upper of said first two wheels and said fourth wheel runs in corresponding fashion to the guide path means between the upper of said first two wheels and said third wheel; and wherein the guide path means between the fourth wheel and the lower of said first two wheels is in the form of an arc.

5. The device according to claim 4 wherein the guide path means between the fourth wheel and the lower of said first two wheels is in the form of an outward curve; said guide path means contacting the fourth wheel only until its lowermost point.

6. The device according to claim 5 wherein said guide path means comprises a number of connected angle bars of bars of flat steel.

7. The device according to claim 6 wherein said rake arm includes support rollers mounted on both ends of its pivot axle for movement over said guide path means.

8. The device according to claim 7 wherein means are provided for rotating at least one of the four deflection chain wheels.

9. The device according to claim 8 wherein said means for rotating at least one of the four chain wheels comprises an electric motor.

10. The device according to claim 9 wherein said electric motor is connected to drive the lower of said first two wheels.

11. The device according to claim 10 wherein a plastic slide rail is positioned over the guide path means between said guide path means and said continuous chain.

12. The device according to claim 10 wherein said stationary bearing having a horizontal pivot axle is mounted on a longitudinal bearing means, said longitudinal bearing means is mounted on a transverse bearing means, and wherein said transverse bearing means is mounted on the walls of the water conduit in which said screen for cleaning is located.

13. The device according to claim 12 wherein the electric motor is mountd on the longitudinal bearing means, wherein a framework means is mounted on the longitudinal bearing means, and wherein said third deflection chain wheel, said fourth deflection chain wheel and the upper of said first two deflection wheels is mounted on said framework, and wherein a portion of said guide path means is mounted on said framework.

14. The device according to claim 13 wherein said rake arm comprises two spaced apart members connected by a transverse strut.

15. The device according to claim 14 wherein said framework means comprises two spaced apart framework structures with said rake arm and said hinged support means mounted therebetween, wherein two separate spaced apart guide path means, and two separate spaced apart continuous chains are provided for individually driving a separate support roller mounted on each side of the pivot axle of said rake arm.

16. The device according to claim 15 wherein said hinged support means comprises two spaced apart elongated members connected together.

17. The device according to claim 16 wherein said screen comb is adjustable in breadth depending on the breadth of the screen used in the water conduit.

18. The device according to claim 16 wherein a covering hood means is positioned over said apparatus with the exception of said screen comb.

19. An installation comprising a screen consisting of upwardly extending parallel bars arranged in a water conduit, and means for cleaning the screen; said cleaning means comprising a rake arm and a hinged support means which are interconnected by a first horizontal axis pivot, the rake arm carrying, at an end spaced from the first pivot, a rake comb having tines adapted to engage between the screen bars, and the hinged support means being pivotably mounted at a location spaced from the first pivot on a fixed support by a second horizontal axis pivot; said cleaning means including guide means defining a looped path positioned entirely above and outside of said conduit, a follower connected to the rake arm at a location spaced from the first pivot and constrained by the guides for movement around the looped path, and drive means for driving the follower around the looped path, the arrangement being such that advancement of the follower around the looped path causes movement of the rake comb from a rest position down to an initial working position in which it is disposed at the bottom of the grating with its tines engaging between the bars of the screen, upwardly to an emptying level at which debris collected by the comb may be discharged into a receptacle, and then back to the rest position.

20. An installation as claimed in claim 19, in which the follower is connected to a location along the length of an endless chain which is arranged for advancement by the drive means around the looped path.

21. The device according to claim 19 wherein said hinged support means includes a counter weight positioned thereon at a point further from said first pivot than said second horizontal axis pivot.

22. The device according to claim 1 wherein said hinged support means is pivotably mounted on said stationary bearing at a point spaced away from the second end thereof, a counter weight being mounted at the second end thereof.

* * * * *